(12) United States Patent  
Krumm et al.

(10) Patent No.: US 8,041,894 B2
(45) Date of Patent: Oct. 18, 2011

(54) METHOD AND SYSTEM FOR A MULTI-LEVEL VIRTUAL/REAL CACHE SYSTEM WITH SYNONYM RESOLUTION

(75) Inventors: Barry W. Krumm, Poughkeepsie, NY (US); Christian Jacobi, Schoenaich (DE); Chung-Lung Kevin Shum, Wappingers Falls, NY (US); Hans-Werner Tast, Boeblingen (DE); Aaron Tsai, Poughkeepsie, NY (US); Ching-Farn E. Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 12/036,357

(22) Filed: Feb. 25, 2008

(65) Prior Publication Data

US 2009/0216949 A1    Aug. 27, 2009

(51) Int. Cl.
    *G06F 13/00*    (2006.01)
(52) U.S. Cl. ............... 711/122; 711/210; 711/E12.024
(58) Field of Classification Search .................. None
    See application file for complete search history.

(56) References Cited

U.S. PATENT DOCUMENTS 5,668,968 A       9/1997   Wu
6,138,226 A  *   10/2000   Yoshioka et al. ............. 711/210
6,751,720 B2     6/2004   Barroso et al.

OTHER PUBLICATIONS

Hunt, et al. "Early Resolution of Address Translation in Cache Design". Proceedings—IEEE International Conference on Computer Design: VLSI in Computers and Processors, Sep. 1990, pp. 408-412.
Wang, et al. "Organization and Performance of a Two-Level Virtual-Real Cache Hierarchy". Conference Proceedings—Annual Symposium on Computer Architecture, No. 16, May 1989. pp. 140-148.
Kim, et al. "A solution to the synonym problem of virtual caches based on implicit flushing". Journal of KISS (A). Computer Systems and Theory. vol. 24. No. 11. Nov. 1997. pp. 1207(English Abstract included).
z/Architecture. "Principles of Operation". Sixth Edition (Apr. 2007). IBM. 1218 pages.

* cited by examiner

*Primary Examiner* — Hetul Patel
(74) *Attorney, Agent, or Firm* — Cantor Colburn LLP; John Campbell

(57) ABSTRACT

Method and system for a multi-level virtual/real cache system with synonym resolution. An exemplary embodiment includes a multi-level cache hierarchy, including a set of L1 caches associated with one or more processor cores and a set of L2 caches, wherein the set of L1 caches are a subset of the set of L2 caches, wherein the set of L1 caches underneath a given L2 cache are associated with one or more of the processor cores.

15 Claims, 8 Drawing Sheets

L1/L2 CACHE HIERARCHY

L1/L2 CACHE HIERARCHY

VIRTUAL ADDRESSED L1 CACHE(S)

REAL ADDRESSED L2 CACHE

| RA | VA SYN | L2V | L2E | L11V | L11E | L12V | L12E | ... | L1NV | L1NE |
|----|--------|-----|-----|------|------|------|------|-----|------|------|

FIG. 4

CONTENTS OF L2 DIRECTORY ENTRY

FLOW FOR
L2 CACHE CONTROL
FOR L1 FETCH FIG. 5

FLOW FOR
L2 CACHE CONTROL
FOR L3 XI FIG. 6

METHOD AND SYSTEM FOR A MULTI-LEVEL VIRTUAL/REAL CACHE SYSTEM WITH SYNONYM RESOLUTION

BACKGROUND OF THE INVENTION

This invention relates generally to cache memory hierarchy, and more particularly to providing handling for cache synonyms for cache memory hierarchies.

A cache memory, or cache, is a high speed memory positioned between a processor and main storage, to hold recently accessed main storage data. Whenever data in storage is accessed, it is first determined whether or not the data is in the cache and, if so, it is accessed from the cache. If the data is not in the cache, then the data is obtained from the main storage and the data is also stored in the cache, usually replacing other data which had been stored in the cache memory.

A cache hierarchy may exist, where multiple levels of cache exist between the processor and main storage. As one gets farther away from the processor, each cache gets larger, slower and cheaper. The cache closest to the processor is called the L1 cache, the next-closest cache is called the L2 cache, and so on. One processor may have multiple L1 caches, such as one L1 cache for data/operands and one L1 cache for instructions. One L2 cache may be connected to multiple L1 caches, where the L1 caches are either for the same processor, or for multiple processors in a multi-processor (mp) system.

In a virtual memory system, a memory access issued by an instruction is usually a va (virtual address, or logical address, or effective address) known to the associated program. The ra (real address, or absolute address, or physical address) in main memory associated with a va can be determined through the translation process. The translation process is a multi-cycle multi-step process that involves table lookups to get the ra.

To speed up the translation, a tlb (translation lookaside buffer, also known as dlat or erat) is used. A tlb holds the va and corresponding ra for recent translations. Depending on architectural requirements, the tlb may need more fields than just the va and corresponding ra.

The portion of an address that is subject to translation is known as a page. A cache has a corresponding directory array which holds the addresses of the data currently in the cache. Each address corresponds to a unit of storage called a line. The address that is stored within a directory array entry is called a tag.

When a fetch request is sent from the core (processor core) to the L1 cache, the fetch's address is compared against the directory, to see if the corresponding data is in the cache. The range of address bits that are used to address the directory is called a directory index or congruence class. A congruence class value may read out data for one or more lines, depending on whether the directory/cache is direct mapped (one way set associative) or greater than one way set associative. A direct mapped cache only accesses one line per congruence class. For example, a four way set associative cache accesses 4 lines per congruence class. For associativity greater than one, each of the lines being read in parallel is called a set (or setid, or way, or compartment, where setid means the identification or label or name given to each set).

For associativity greater than one, when fetch data is returned from the next level of cache hierarchy, output from an lru array determines which of the setid's the data should be written in. Lru means least-recently-used. The idea is to put the data in a setid that hasn't been referenced recently, to help performance. There are various approaches for lru algorithms. If the setid where the fetch data will be written already has a valid line of data in it, then when that line is written over, that is called lru-ing out the line. For associativity greater than one, the directory compare results (one compare per setid) are used to multiplexer-down the cache output, to select the setid of interest. These cache multiplexer controls are called the late selects. Because accessing the tlb and directory arrays and then waiting to use their compare results as late selects to multiplexer-down the cache output can possibly lengthen a processor pipeline or cycle time, sometimes another array (in addition to the directory array) is used to create the late selects. This array can be called a set predict array. One approach for a set predict array is to structure it like a directory, with multiple setid's and compares, but only implement a subset of tag bits.

Another approach for a set predict array is to not have any compares, but instead use the array output directly as the late selects. If a set predict array is used, its result must be compared to the result from the directory, to verify that the set predict array predicted correctly. When data for a particular fetch request is returned from an L1 cache read to the core, or data for a store request is written into the L1 cache from the core, the amount of data written/read is usually less than a line, with possibilities such as a hw (halfword), wd (word), dw (doubleword), qw (quadword) or ow (octword). For caches over a certain size, the cache and directory index includes bits that are subject to translation. The invention only applies to this case. For such a case, the pair of arrays either use va bits or ra bits for those bits. If va bits are used, then the possibility of synonyms exists.

In general, a synonym (or alias) occurs when two different va's map to the same ra. The subclass of synonyms that apply to the invention are cases where the subset of virtual address bits used to index the L1 cache have different values for the 2 synonyms. When the terms 'synonym' or 'cache synonym' are used in this description, they will be referring to this subclass. The terms 'synonym bits' or 'va syn' refer to this subset of virtual address bits.

For a directory that is virtual-address-indexed, the tag field in the directory array may be either a va or an ra. For an ra tag directory, the directory output must be compared against the ra output from the tlb. For a va tag directory, the directory output can be compared directly to the va from the core. A va tag directory acts like a combination tlb and ra tag directory. If architecture requires the tlb to compare on more fields than just the va, in order to know whether a given translation is valid, then these other fields may also be needed in a va tag directory. Normally, a given va maps to only one corresponding ra at a time. However, bad programming could result in one va mapping to multiple ra's at the same time. If this happens, a va tag directory could use a translation that is different than the tlb. Depending on architectural requirements, detection of this case may be used to: detect an error, attempt to clean up this unusual condition, or take no special action.

Cache coherency involves making sure that the storage image across the cache hierarchy is consistent. One approach to cache coherency involves exclusivity. A line of data can only be stored to when it is held exclusive by one L1 cache. However, a line can be held read-only by several caches. In a cache hierarchy, a given level of cache can track exclusive/read only ownership of the lines in the caches one level below, as long as the caches one level below only contain a subset of the lines that are in the cache level doing the tracking.

When an L1 cache sends a fetch request to L2, command codepoints say whether the fetch is for read-only, exclusive, or cex (conditional-exclusive) ownership of the line. Cex means the line may or may not be returned with exclusive ownership.

If, for example, one L1 cache sends a fetch exclusive to the L2 cache, and the L2 cache's directory indicates that another L1 cache connected to that L2 currently has that line, the L2 sends an xi (cross-interrogate) invalidate to that other L1 cache. The other L1 cache searches its directory for the xi. If the line is in the directory, then it is invalidated.

As another example, if one L1 cache sends a fetch read-only to the L2, and the L2 cache's directory indicates that another L1 cache currently has that line exclusive, then the L2 sends an xi demote to that other L1 cache. The other L1 cache searches its directory for the xi. If the line is in the directory, then the exclusive bit in that L1 directory is turned off, but the L1 directory's valid bit remains on.

In terms of how stores are implemented for the subset of L1 caches that are stored-to, there are two main approaches. For a store-thru or write-thru cache, when store data is written into the cache, the store data is also forwarded to the next-higher level of cache hierarchy around the same time, with the granularity of data usually being less than a line: for example: a hw, wd, dw, qw, or ow. For a store-in or write-back cache, the store data isn't sent to the next cache level immediately. Instead, the data only gets sent when the line is about to be lru'ed-out of the cache, or the next level of cache hierarchy is requesting that data. For example, if the L2 cache sent a store-in L1 cache a demote xi, then at that point, the L1 cache would send the data to the L2 cache. The data transfer would typically be a multi-cycle transfer for the full line, regardless of how much of the line was stored-to. For a store-in cache, the cache directory includes a status bit that says whether the line was stored-to, to know when such a data transfer to the next cache level is needed.

When an L1 cache that is stored-to receives a demote or invalidate xi for a line that the L1 cache currently has exclusive, and a store-thru L1 cache is working on storing to that line, or a store-in cache is working on storing to that line or has stored to that line, the L1 cache can not give up exclusivity of that line until the store data has been sent to the next level of cache hierarchy. One approach for this case is for the L1 cache to delay telling the next level of cache hierarchy that the xi is done, until the stores have been sent.

Another approach for this case is for the L1 cache to reject the xi to the next level of cache hierarchy, and have the xi be repeatedly sent to the L1 cache until it is no longer rejected.

It would be desirable/advantageous to be able to resolve synonym conflicts while maintaining cache coherency in a cache hierarchy.

BRIEF SUMMARY OF THE INVENTION

An exemplary embodiment includes a multi-level cache hierarchy, including a set of L1 caches associated with one or more processor cores and a set of L2 caches, wherein the set of L1 caches are a subset of the set of L2 caches, wherein the set of L1 caches underneath a given L2 cache are associated with one or more of the processor cores.

Another exemplary embodiment includes a method including mapping a virtual address fetch request from a processor core to a L1 cache to a real address by a tlb, in response to the real address residing in a real-address-tagged L1 directory, returning fetch data from the L1 cache to the processor core, in response to the real address absent from the real-address-tagged L1 directory, sending the real address and synonym bits associated with the real address as a fetch request to a L2 cache, comparing real address bits and the synonym bits to a real-address-tagged L2 directory and in response to at least one of an absence of a real address comparison, an L2 valid bit being off or the fetch request to the L2 cache being exclusive with a L2 exclusive bit being off, sending a new fetch request to a next level of the multi-level cache hierarchy.

A further exemplary embodiment includes a multi-level cache hierarchy, including a set of L1 caches associated with one or more processor cores and a set of L2 caches, wherein the set of L1 caches are a subset of the set of L2 caches, wherein the set of L1 caches underneath a given L2 cache are associated with one or more of the processor cores, wherein the L1 directory includes control bits for valid and exclusive, and the L2 directory includes a value of synonym bits that applies to each L1 cache of the set of L1 caches underneath a L2 cache having the L2 directory, and wherein the L2 directory includes L2 control bits for valid and exclusive, and for each L1 cache of the set of L1 caches underneath L2 cache, L1 control bits for valid and exclusive.

BRIEF DESCRIPTION OF THE DRAWINGS

Referring now to the drawings wherein like elements are numbered alike in the several FIGURES:

FIG. 4 illustrates contents of an L2 directory entry in accordance with an exemplary embodiment;

Figure 1:
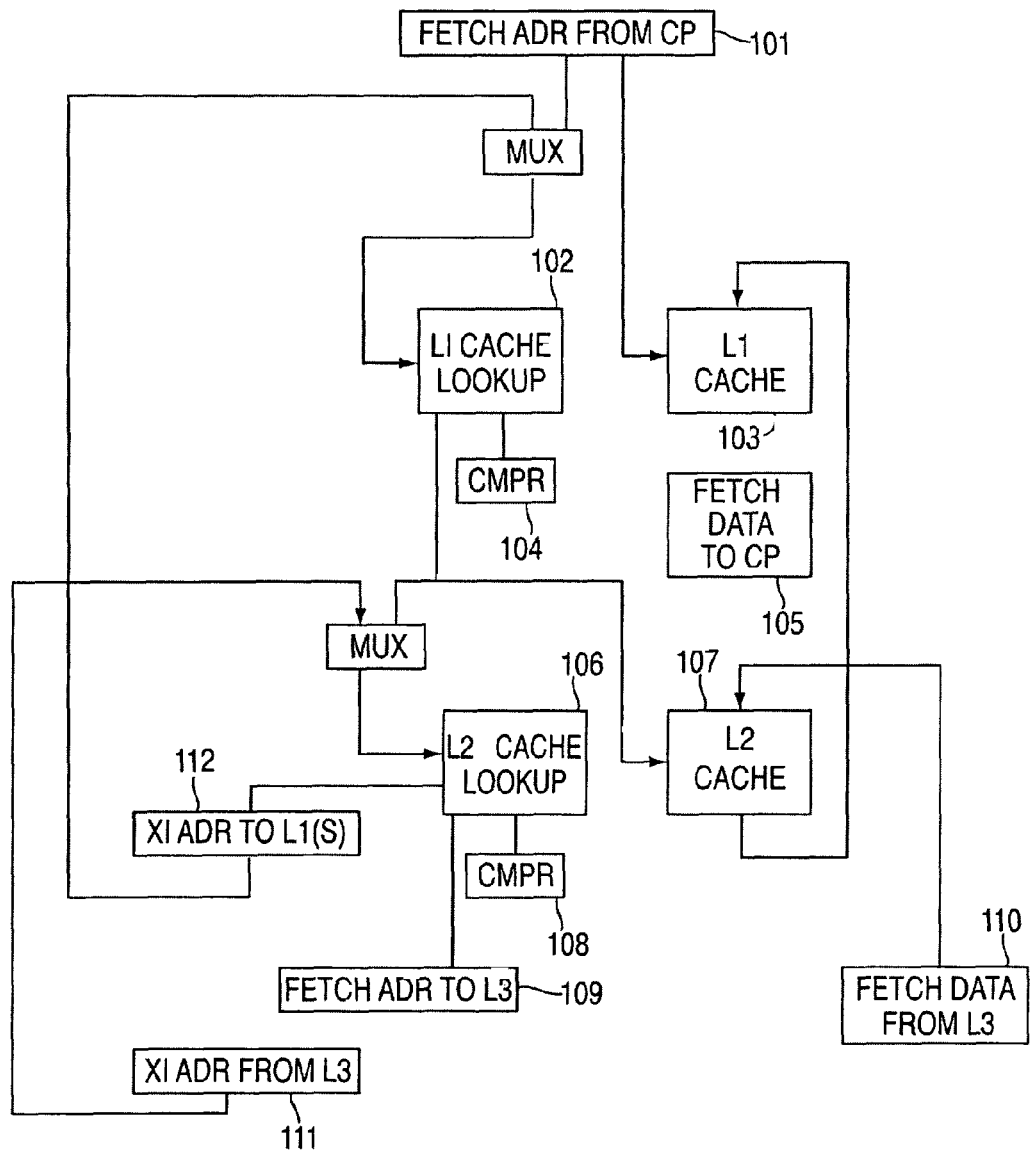
FIG. 1 illustrates a block diagram of an overview of the L1/L2 cache hierarchy in accordance with an exemplary embodiment.

The detailed description explains the preferred embodiments of the invention, together with advantages and features, by way of example with reference to the drawings.

DETAILED DESCRIPTION OF EXEMPLARY EMBODIMENTS

An exemplary embodiment of the present invention provides a multi-level virtual/real cache system with efficient synonym resolution. In an exemplary embodiment, the virtual-address-indexed L1 caches have virtual-address-indexed directories with real address tags. The real-address-indexed caches beyond the L1 cache have real-address-indexed directories with real address tags. The L2 cache directory entries also include one value of the synonym bits that applies to all L1 caches underneath a given L2 cache. When the L2 directory detects a synonym conflict for an L1 fetch, the same L2 sequencing that is used to handle cache coherency across several L1 caches is used to handle the synonym conflict. In an exemplary embodiment, the L2 sends a xi to the L1 caches to invalidate the synonym, before sending fetch data back to the requesting L1 cache. The L1 cache is not aware that a synonym was detected, and the L1 cache has no special sequencing to handle synonyms. In another exemplary embodiment, all L1 caches underneath a given L2 cache do not need to use the same synonym bit value, but the variations add array area, and some of the variations add unique sequencing.

In an exemplary embodiment, the subset of virtual address bits are used to index the L1 cache have different values for the 2 synonyms. When the terms 'synonym' or 'cache synonym' are used in this description, they will be referring to this subclass. When the terms 'synonym bits' or 'va syn' are used in this description, they are referring to this subset of virtual address bits.

In an exemplary embodiment, L1 cache(s) can include the following arrays: 1) va-indexed L1 cache 2) va-indexed ra-tagged directory 3) tlb (translation lookaside buffer) 4) optional va-indexed va-tagged setp predict array or optional va-indexed va-tagged directory Furthermore, L2 cache(s) can include the following arrays: 1) ra-indexed L2 cache 2) ra-indexed ra-tagged directory. The L2 cache may be a private L2 for one core (processor core), where that core has one or more L1 caches, or the L2 cache may be a shared L2 for several cores, where each core has one or more L1 caches. The L1 cache(s) are a subset of the L2 cache.

In an exemplary embodiment, the systems and methods described herein are not dependent on: 1) whether L1 caches are store-in or store-thru 2) whether the L1 cache tells the L2 cache about L1 cache lruouts. L1 fetches to the L2 cache send the synonym bits, in addition to sending the ra. L2 xi's to the L1 cache(s) send the synonym bits, in addition to sending the ra. The directory for the L2 cache(s) saves one value of the synonym bits that applies to all L1 caches underneath a given L2 cache. When the L2 directory detects a synonym conflict for an L1 fetch, the same L2 sequencing that is used to handle cache coherency across several L1 caches is used to handle the synonym conflict. In an exemplary embodiment, the L2 sends a xi to the L1 cache (s) to invalidate the synonym, before sending fetch data back to the requesting L1 cache. The L1 cache is not aware that a synonym was detected, and has no special sequencing to handle the synonym conflict.

In an exemplary embodiment, the L1 cache processes xi's caused by synonyms the same way it processes cache coherency xi's. The L1 cache processes L2 fetch data returns for a synonym conflict the same way it processes data returns that had no synonym conflict. When the L1 cache processes a xi, the synonym bits are used as part of the va index for the ra tagged directory.

As described herein, the directory for the L2 cache(s) saves one value of the synonym bits that applies to all L1 caches underneath a given L2 cache. In an exemplary embodiment, alternatives to the above described add more array area, and can include added complexity/new sequencing. The alternatives can include: 1) save one value of synonym bits per L1 cache, so that 2 L1 caches can simultaneously have different synonym values; 2) Have a control bit that says whether multiple synonyms exist, using it to generate multiple synonym xi's, by incrementing through all possible values of the synonym bits; 3) Save multiple values of synonym bits per L1 cache. Allow a given L1 cache to have multiple read-only synonyms. If the L1 cache fetches the line exclusive, then only allow one synonym value, by sending multiple synonym xi's.

FIG. 1 illustrates a block diagram of an overview of the L1/L2 cache hierarchy in accordance with an exemplary embodiment. Store dataflow is not shown for illustrative purposes. An address for a fetch comes in from the cp to register 101. The address is used to search the L1's lookup structure 102. In parallel, a read of potential data from the L1 cache 103 is performed. In an exemplary embodiment, if the L1 lookup structure gets a compare or "hit" 104, then data from the L1 cache is returned to the cp 105. In an exemplary embodiment, if the L1 lookup structure obtains a fetch "miss" 104, then a fetch address is sent to search the L2's lookup structure 106. In parallel, a read of potential data from the L2 cache 107 is performed. In an exemplary embodiment, if the L2 lookup structure obtains a compare or "hit" 108, then data from the L2 cache 107 is returned to write the L1 cache 103, and data goes from the L1 cache to the cp 105. In an exemplary embodiment, if the L2 lookup structure obtains a "miss" 108, then a fetch address is sent to the L3 109. Fetch data is returned from L3 110 to write the L2 cache 107, and to write the L1 cache 103, and data flows from the L1 cache to the cp 105.

In an exemplary embodiment, to handle cache coherency, the L2 receives xi invalidate requests from L3 111. In an exemplary embodiment, L3 is the cache coherency manager, or storage controller. The xi searches the L2 cache lookup structure 106. If the L2 lookup structure obtains a hit in the L2 108, then the corresponding L2 cache line is invalidated. Furthermore, if the L2 lookup structure detects that the L1(s) may also have a copy of that line, then the L2 sends the xi address 112 to the L1(s). In this case, the L1(s) are a subset of the L2. The xi searches the L1 cache lookup structure 102. In an exemplary embodiment, if the L1 lookup structure obtains a hit 104 in the L1, then the corresponding L1 cache line is invalidated.

Figure 2:
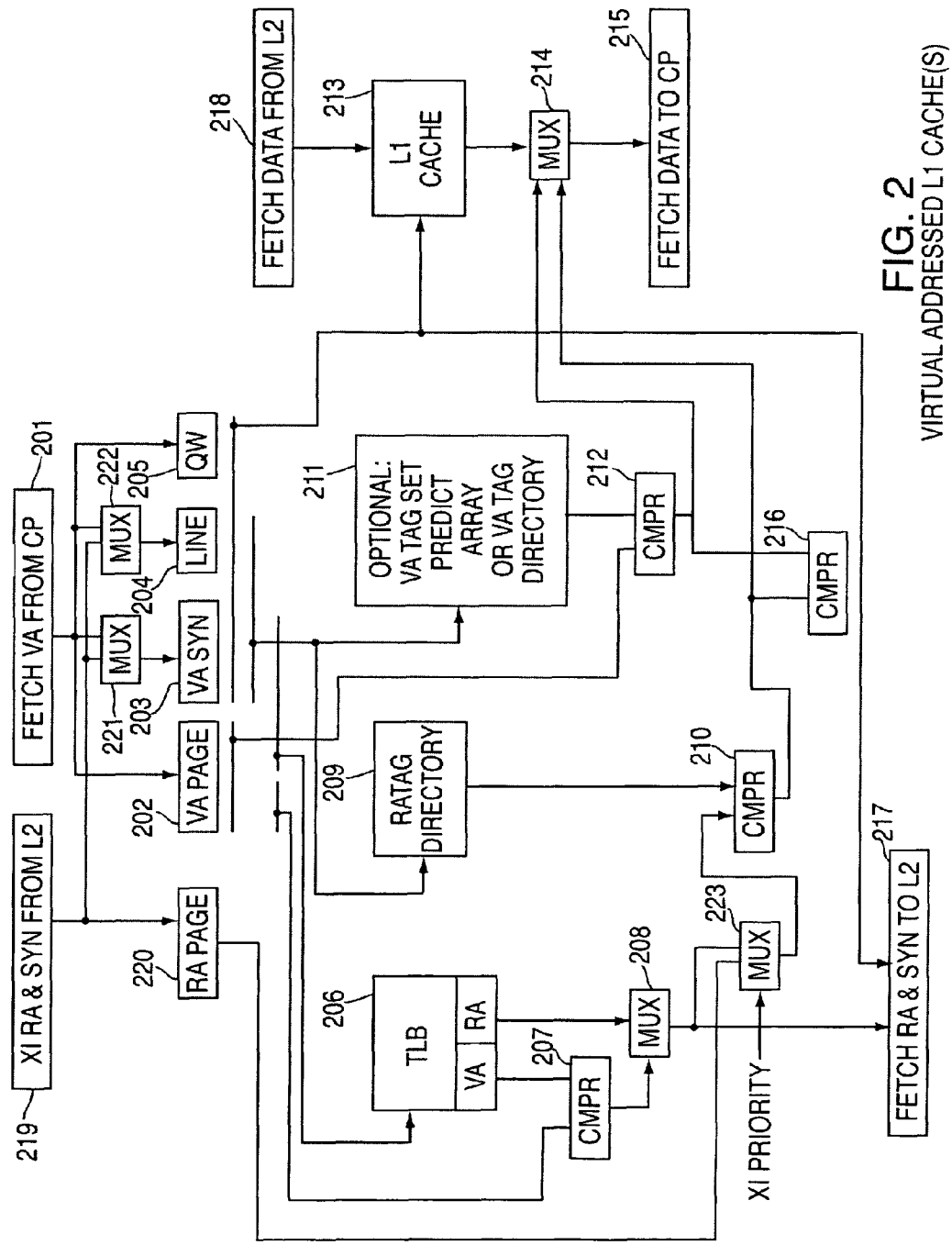
FIG. 2 illustrates a block diagram of the virtual addressed L1 cache(s) in accordance with an exemplary embodiment.

FIG. 2 illustrates a block diagram of the virtual addressed L1 cache(s) in accordance with an exemplary embodiment. Store dataflow is not shown for illustrative purposes. In an exemplary embodiment, a va (virtual address) for a fetch comes in from the cp 201. The fetch va is then read into a register that is shown here vertically sliced into four parts, which are va page 202, va syn 203, line 204, and qw 205. In exemplary embodiment, the value of qw is arbitrarily selected for illustrative purposes.

In an exemplary embodiment, the va page 202, together with the va syn 203, form the full va page address that is subject to address translation. Va syn 203 are known as the synonym, or aliasing bits. Line 204 is the address of the line of interest within a page. Qw 205 is the address of the quad-word of interest within the line. In an exemplary embodiment, the fetch address is used to read up to four arrays in parallel. The four arrays described herein are known to those skilled in the art. In an exemplary embodiment, a group of two or three non-cache arrays is known as the lookup structure. All arrays in the lookup structure obtain compares, or "hits", to be able to return valid data to the cp from the L1 cache. In an exemplary embodiment, the tlb array 206 is used to translate va pages to ra pages. If the tlb does not obtain a hit, then address translation occurs. The tlb is addressed with va syn 203 and part of va page 202. In addition, part of the tlb output is compared at a comparator 207 against the rest of the va page 202. In an exemplary embodiment, there may be several compares for the comparator 207, one per tlb setid, for a tlb that has set associativity greater than one. If there is a tlb hit 207, then the corresponding ra's from several tlb setid's are multiplexed-down 208 using the obtained hit information.

In an exemplary embodiment, the ra tag directory 209 is implemented to determine if the corresponding line of data is in the L1 cache. In an exemplary embodiment, the ra tag directory 209 is addressed with the va syn 203 and the line 204. In addition, the output of the ra tag directory 209 is compared at a comparator 210 against the ra from the tlb 208. In an exemplary embodiment, there may be several compares for the comparator 210, one per directory setid, for a directory and cache that is greater than one way set associative. In an exemplary embodiment, additional tlb/directory compares can be implemented in a more parallel fashion to improve overall compare speed. Furthermore, the optional va tag set predict array or va tag directory is used to improve speed for the L1 cache data return by providing faster compare results at a comparator 212 than the ra tag directory compares at a comparator 210. In addition, a va tag directory is addressed by va syn 203 and line 204. The va tag directory output is compared against the va page 202 for a comparison at a comparator 212. In an exemplary embodiment, there can be several compares for the comparator 212, one per directory setid.

In an exemplary embodiment, a va tag set predict array is addressed by va syn 203 and line 204, but compares against only part of the va page 202. In another exemplary embodiment, a va tag set predict array is addressed by part of va page 202, in addition to being addressed by va syn 203 and line 204. For this second approach, there is no comparison at the comparator 212. The L1 cache array 213 is addressed with va syn3 and line 204 and qw 205. In an exemplary embodiment, the L1 cache is "virtual addressed" because va syn 203 is part of the address to the cache. Several setid's worth of data are read out of the L1 cache in parallel. The directory compares are used to multiplex this output data 214. In an exemplary embodiment, if the optional va tag set predict array or va tag directory 211 is not implemented, then the ta tag directory comparator 210 controls the multiplexer 214. In an exemplary embodiment, if the optional va tag set predict array or va tag directory 211 is implemented, then just its compare output from the comparator 212 controls the multiplexer 214, and the ra tag directory comparator 210 does not control the multiplexer 214.

In an exemplary embodiment, the multiplexed L1 cache data is returned to the cp 215. If the optional va tag set predict array 211 is implemented, the comparator 216 determines whether the set predict array guessed correctly. If the set predict array did not guess correctly, then a control signal prevents the cp from using the L1 cache data, and the set predict array is updated. If the optional va tag directory array 11 is implemented, the comparator 216 detects when the va tag directory 211 is out of sync with the combined tlb 206 and ra tag directory 209 comparator 210 result. However, the comparator 212 can hit on one setid and the comparator 210 can hit on a different setid. One way this can happen is that instructions allow one va to translate to two different ra's at the same time, where the va tag directory array used one translation, and the tlb used another translation.

In an exemplary embodiment, if the tlb 206 obtains a hit, but the ra tag directory 209 obtains a miss, then the fetch address is sent to L2 217. The fetch address sent to L2 is made up of the ra page from the tlb multiplexer 208, the va syn 203, the line 204 and the qw 205. In an exemplary embodiment, the L1 cache is not required to tell the L2 cache which L1 cache location is going to be lru'ed out by the upcoming L2 data return. In addition, the L1 cache's lru array may not be read until shortly before the L2 data return starts. Fetch data from L2 218 can be used to write the L1 cache. At the start of the L1 cache write, the ra tag directory 209 and the optional va tag set predict array or va tag directory are written with info for the new valid line of data.

In an exemplary embodiment, an xi invalidate address 219 can come in from L2. The address goes into ra page 220, va syn 203 and line 204, using multiplexers 221 and 222 for part of the process. The xi the searches only the ra tag directory 209. The tlb 206 output multiplexer 208 is bypassed by putting ra page 220 onto multiplexer output 223. The ra tag directory comparator 210 detects if the xi got a hit. In an exemplary embodiment, it takes one cycle to do the xi search. If the xi obtains a hit, the valid bit in the ra tag directory 209 is turned off. If an optional va tag set predict array 211 is implemented, and the approach for a va tag set predict array is addressed by va syn 203 and line 204, but compares against only part of va page 202 is implemented, an xi hit can optionally turn the set predict array's valid bit off. If an optional va tag set predict array 211 was implemented, and the approach for a va tag set predict array is addressed by part of va page 202, in addition to being addressed by va syn 203 and line 204 is implemented, the set predict array is not updated. If an optional va tag directory 211 is implemented, an xi hit turns the va tag directory's valid bit off.

Figure 3:
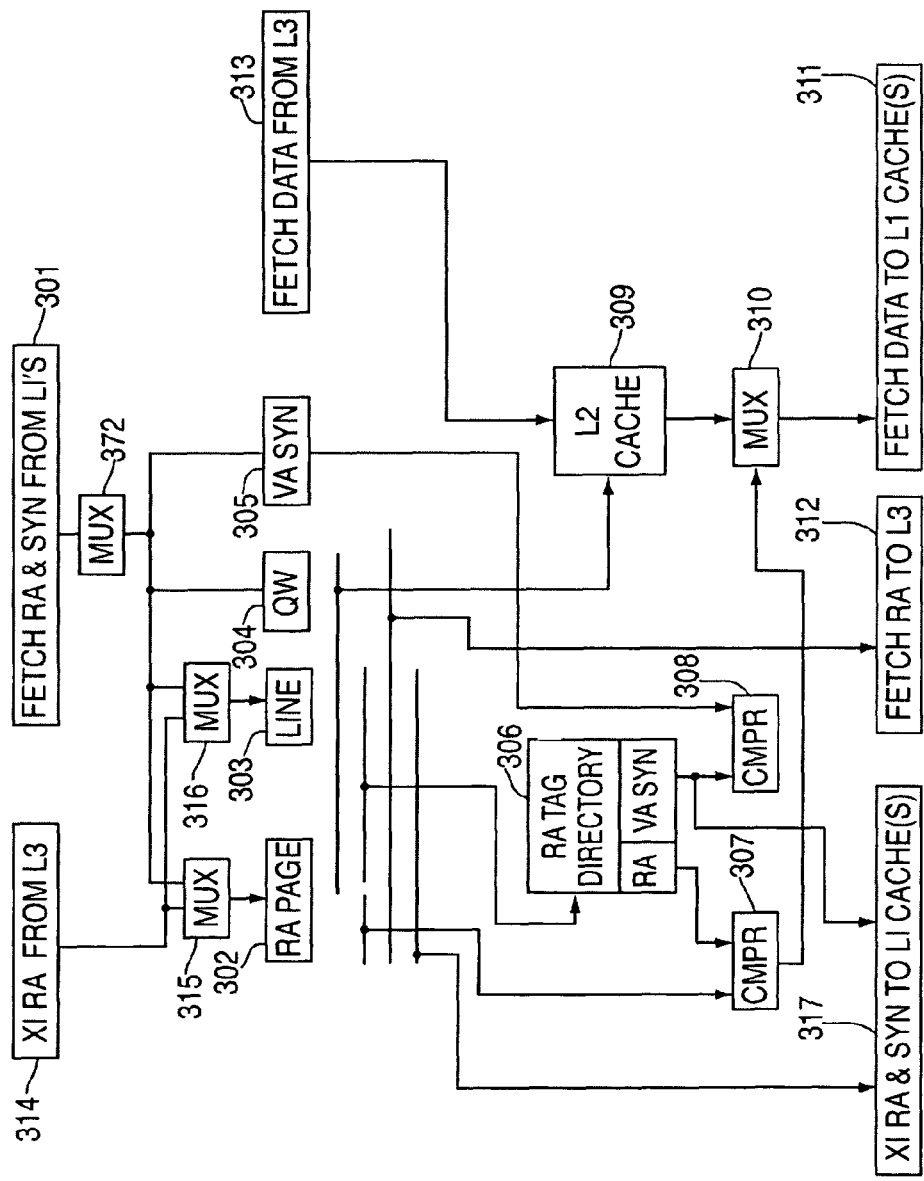
FIG. 3 illustrates a block diagram of the real addressed L2 cache(s) in accordance with an exemplary embodiment.

FIG. 3 illustrates a block diagram of the real addressed L2 cache(s) in accordance with an exemplary embodiment. For illustrative purposes, the store dataflow is not shown. A ra (real address) and synonym va bits for a fetch from L1 comes into the L2 301, which are then multiplexed at the multiplexer 372 with fetch requests from other L1's. The fetch then goes into a register that is illustrated as vertically sliced into four parts, including ra page 302, line 303, qw 304 and va syn 3.05. In an exemplary embodiments the fetch address is used to read two arrays in parallel. The ra tag directory 306 is used to check that the corresponding line of data is in the L2 cache. The ra tag directory 306 is addressed by the line 303 and part of ra page 302. The ra tag directory 306 ra output is compared with the comparator 307 against the rest of ra page 302. The ra tag directory 306 va Syn output is compared at the comparator 308 against the va syn 305. In an exemplary embodiment, there may be several compares for the comparators 307, 308, one per directory setid. The va syn comparator 305 is discussed further with respect to FIG. 5.

In an exemplary embodiment, the L2 cache array 309 is addressed with the line 303, the qw 304, and part of the ra page 302. Several setid's worth of data are read out of the L2 cache in parallel. The directory ra comparators 307 are used to multiplex the output data at the multiplexer 310. The multiplexed L2 cache data is then returned to the L1 cache 311. If the ra tag directory 306 obtains a miss 307, then the fetch address is sent to the L3 312. The fetch address sent to L3 is made up of the ra page 302, the line 303 and the qw 304. Fetch data from L3 313 is used to write the L2 cache. At the start of the L2 cache write, the ra tag directory 306 is written with information for the new valid line of data, including the va syn 305 that came with the fetch from L1 301.

In an exemplary embodiment, an xi invalidate address 314 can come in from L3. The address goes into the ra page 302 and the line 303, via the multiplexers 315, 316. The xi then searches the ra tag directory 306. The ra tag directory comparator 307 detects if the xi obtained a hit. In an exemplary embodiment, if the xi obtained a hit, control bits within the ra tag directory are checked to determine if the L1(s) may have a valid copy of the line. If the L1(s) have a valid copy of the line, the xi is forwarded to the L1(s). The address sent to the L1(s) 317 includes the ra page 302 and the line 303, as well as va syn from the ra tag directory. If the xi obtained a hit, the valid bit in the ra tag directory 306 is turned off.

FIG. 4 illustrates contents of an L2 directory entry in accordance with an exemplary embodiment. For cache coherency, the distinction between exclusive and read-only is reflected in the L2 directory entry contents as illustrated in FIG. 4. In an exemplary embodiment, L2V determines whether the corresponding line ra is valid in the L2 cache. L2E determines whether the L2 has exclusive ownership of that line, from the L3 cache's point of view. For the 1st L1 cache connected to this L2 cache, L11V determines whether that L1 cache has a valid copy of that line, from the L2 cache's point of view. L1's ra tag directory may no longer have the line, because it was lru'ed out, if the design does not inform the L2 cache of L1 cache lruouts. L11E determines whether that L1 cache's line is held with exclusive ownership. For the second L1 cache connected to this L2 cache, L12V and L12E are the valid and exclusive bits for the second L1 cache, and so on, up to L1NV and L1NE for the Nth L1 cache connected to the L2 cache. In an exemplary embodiment, if some of the L1 caches are not allowed to have exclusive ownership of lines, because they are not directly stored, then the L2 directory L1NE bits are not needed for these L1 caches. The L1 caches may be multiple L1 caches for a single core connected to a private L2, or multiple L1 caches for multiple cores connected to a shared L2. The va syn field in the L2 directory entry contains the current synonym bits value for one or more L1's that have the line valid. In an exemplary implementation, if multiple L1's have the line valid, they share the same value of va syn. These multiple L1's could be for the same cp or for multiple cp's.

In an exemplary embodiment, the contents of the L2 directory entry could include 1) a separate va syn field for each L1; 2) a bit in the L2 directory entry that says multiple va syn values exist, 3) save multiple va syn values for read-only lines for each L1 cache.

Figures 5, 5A:
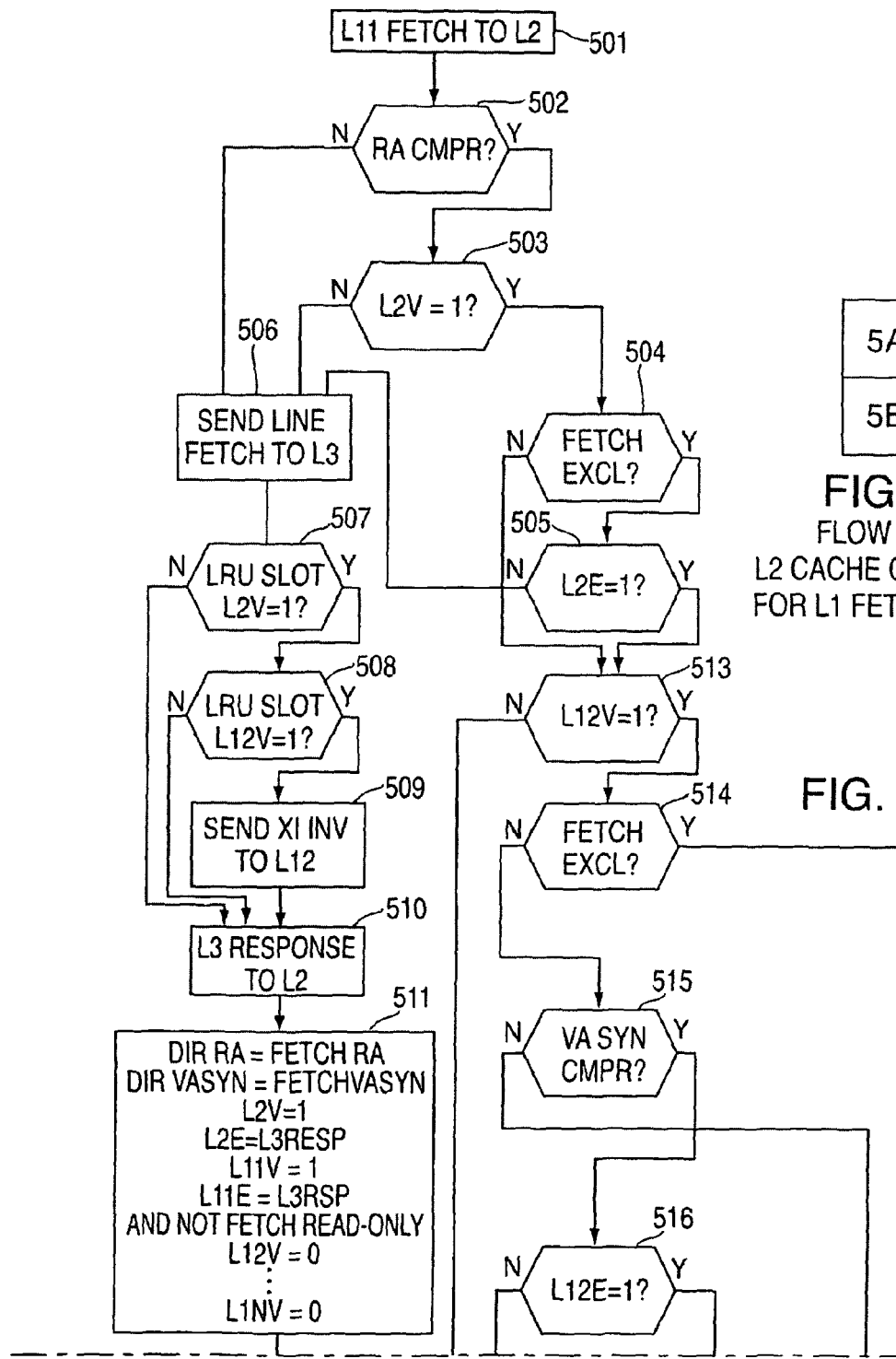
FIG. 5 illustrates a flow diagram of a method for a L2 cache controlling an L1 fetch in accordance with an exemplary embodiment.
Figure 5B:
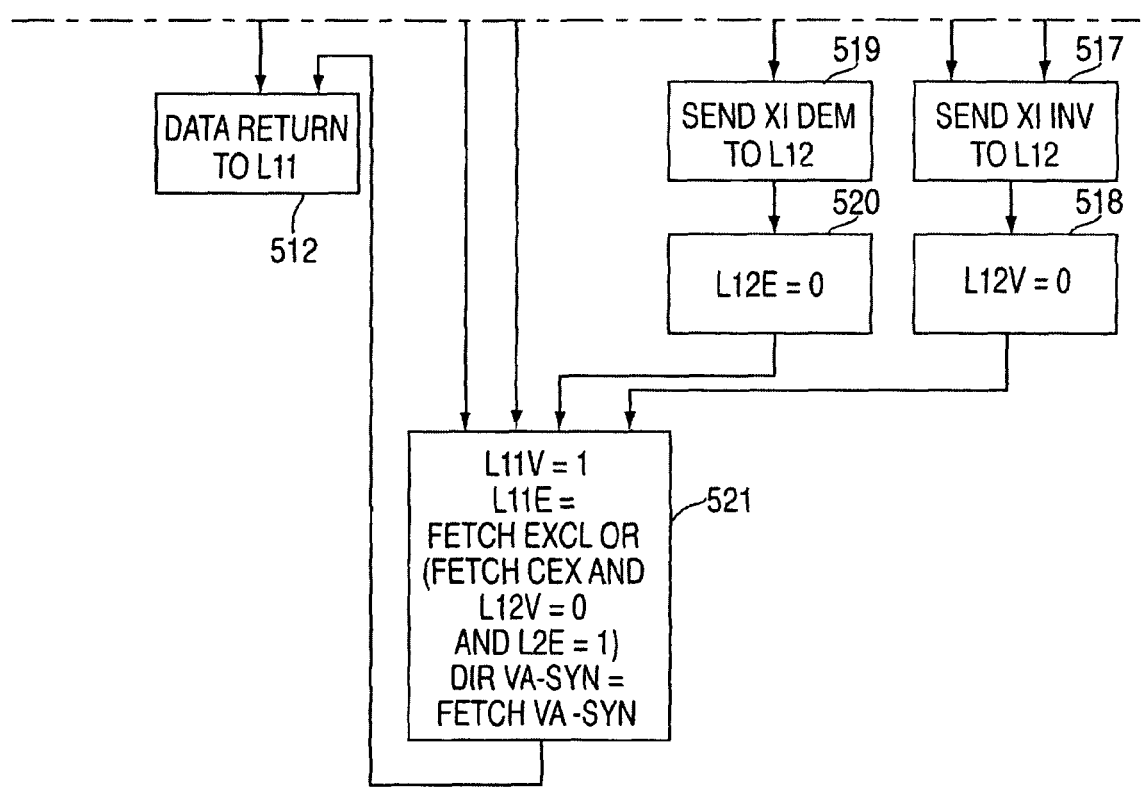

FIG. 5 illustrates a flow diagram of a method for a L2 cache controlling an. L1 fetch in accordance with an exemplary embodiment. For an L1 cache miss fetch sent to L2 at block 501 (for illustrative purposes, an arbitrary L1 cache is selected), there can be four cases: 1) L2 cache miss without xi; 2) L2 cache miss with xi; 3) L2 cache hit without xi; and 4) L2 cache hit with xi L2 cache miss without xi: If there is an ra cmpr miss at block 502 (FIG. 3, 307), or the L2V bit at block 503 is off (see FIG. 4), or the fetch request is exclusive at block 504 and the L2E bit at block 505 is off (see FIG. 4), then a fetch request is made to the next level of cache hierarchy at block 506. If the slot selected for replacement in the L2 cache by the lru does not have a valid entry at block 507, or that entry does not have any 1 L1 valid bit on at block 508 (see FIG. 4), then there is no lru-out. When L3 responds to L2 at block 510, several L2 directory fields are updated at block 511. FIG. 4 includes an explanation of the fields. The L3 response information includes whether the line was returned with exclusive ownership, so that is used to help update L2E and L11E. Data from L3 is returned to the requesting L1 cache at block 512. Although the flow diagram illustrates the data return at block 512 occurring after the writing of the L2 directory bits at block 511, the order of these two events can be the opposite of what is shown, or can occur at the same time, in another exemplary embodiment.

L2 cache miss with xi: If there is an ra cmpr miss at block 502 (FIG. 3, 307), or the L2V bit at block 503 is off (see FIG. 4), or the fetch request is exclusive at block 504 and the L2E bit at block 505 is off (see FIG. 4), then a fetch request is made to the next level of cache hierarchy. If the slot selected for replacement in the L2 cache by the lru has a valid entry at block 507, and the entry also has at least 1 L1 valid bit on at block 508 (see FIG. 4), then an xi invalidate is sent to that L1 cache at block 509 (FIG. 3, 317). Although the flow diagram only shows one L1 valid bit (L12V) being checked, all the L1 valid bits are checked (only one is shown, to simplify the diagram). As discussed herein with respect to FIG. 4, an exemplary embodiment could have bits in the L2 directory entry indicating that multiple va syn values exist. Where a given L1 cache had multiple va syn values, then the single xi becomes multiple xi's, one for each possible value of the va syn bits. When L3 responds to L2 at block 510, several L2 directory fields are updated at block 511. FIG. 4 includes an explanation of the fields. Data from L3 is returned to the requesting L1 cache at block 512. Although the flow diagram illustrates the data return at block 512 occurring after the writing of the L2 directory bits at block 511, the order of the two events can be the opposite of what is shown, or can occur at the same time, in an exemplary embodiment.

L2 cache hit without xi: If there is an ra cmpr hit at block 502, and the L2V bit at block 503 is on, and (the fetch request was not exclusive at block 504 or the L2E bit is on at block 505), and for each L1 cache, the L1 cache valid bit in the L2 directory is off at block 513, or (the fetch request was not exclusive at block 514 and there was a va syn cmpr at block 515 (FIG. 3, 308) and the L1 cache exclusive bit in the L2 directory is off at block 516), then several L2 directory fields are updated at block 521 and data from L2 is returned to the requesting L1 cache at block 512. Although each L1 cache is checked, just the L12V bit at blocks 513, 521 and the L12E bit at block 516 are illustrated to simplify the flow diagram.

L2 cache hit with xi: If there is an ra cmpr hit at block 502, and the L2V bit at block 503 is on, and (the fetch request was not exclusive at block 504 or the L2E bit is on at block 505), and for at least one L1 cache, the L1 cache valid bit in the L2 directory is on at block 513, and (the fetch request is exclusive at block 514 or there is not a va syn cmpr at block 515 or the L1 cache exclusive bit in the L2 directory is on at block 516), then an xi is sent to the L1(s). As described with respect to FIG. 4, an exemplary embodiment could have bits in the L2 directory entry indicating that multiple va syn values exist. For cases where a given L1 cache had multiple va syn values, then the single xi becomes multiple xi's, one for each possible value of the va syn bits. For the cases where the fetch is exclusive or there was not a va syn cmpr, an xi invalidate is sent at block 517, and the L2 directory's L1 valid bit is turned off at block 518. Where the fetch request is not exclusive and there was a va syn cmpr and the L1 cache exclusive bit in the L2 directory is on, an xi demote is sent at block 519, and the L2 directory's L1 exclusive bit is turned off at block 520. Several other L2 directory fields are updated at block 521 and data from L2 is returned to the requesting L1 cache at block 512. The requesting L1 cache writes the data into the L1 cache using the same va syn value it sent to the L2. Although each L1 cache is checked, the L12V bit at blocks 513, 518, 521 and the L12E bit at blocks 516, 520 are illustrated to simplify the flow diagram. The fetch exclusive mp coherency case at block 514 and the 'no va syn cmpf' case at block 515 are handled identically, without any unique sequencing for the synonym mismatch case.

Figures 6, 6A:
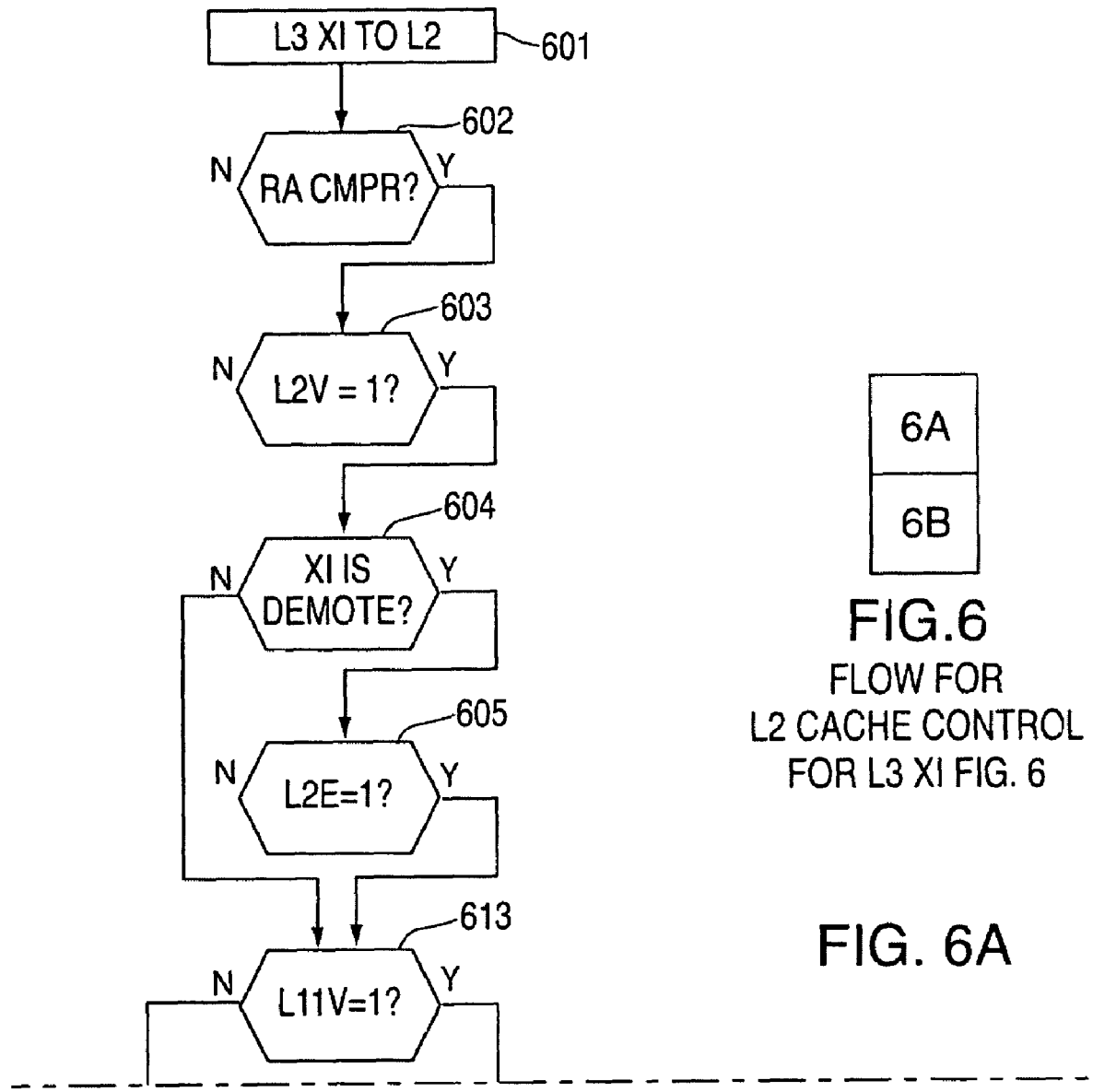
FIG. 6 illustrates a flow diagram of a method for a L2 cache controlling an L3 xi in accordance with an exemplary embodiment.
Figure 6B:
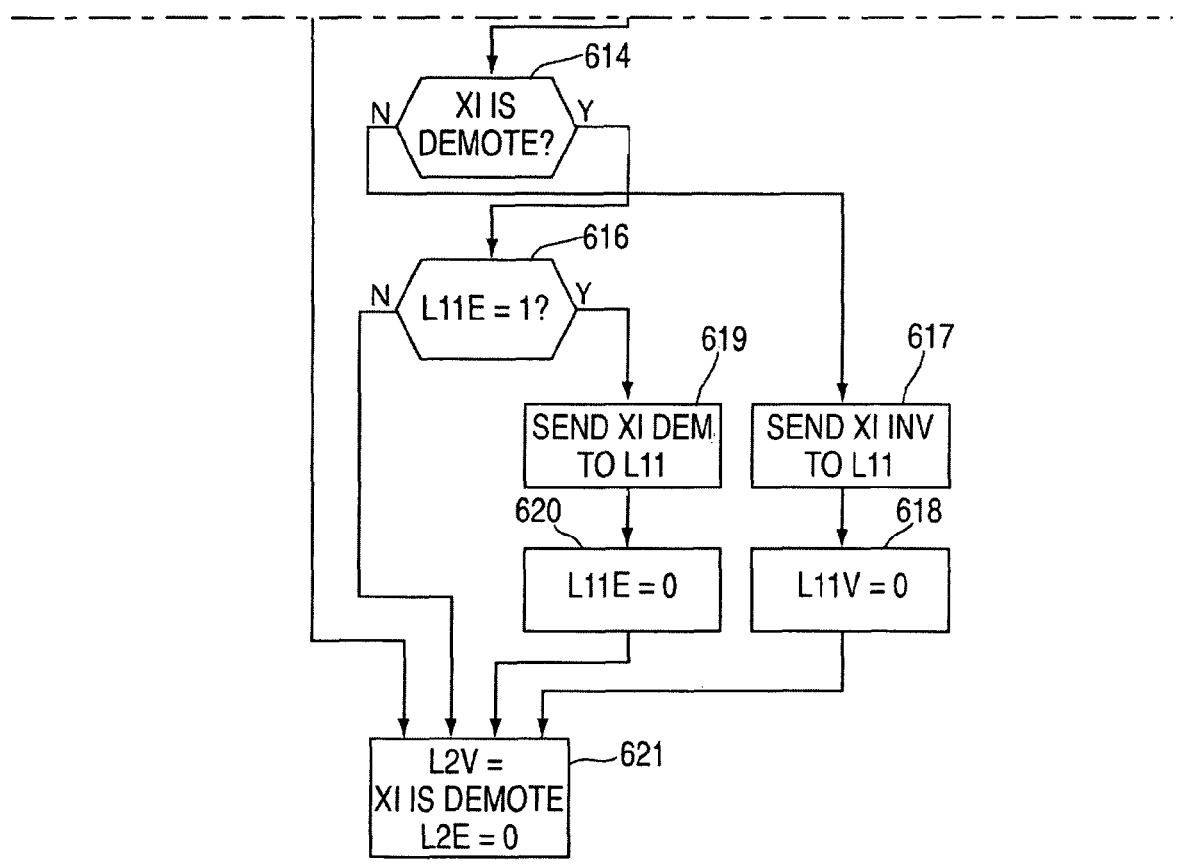

FIG. 6 illustrates a flow diagram of a method for a L2 cache controlling an L3 xi in accordance with an exemplary embodiment. For an L3 xi sent to L2 at block 601 if there is an ra cmpr hit at block 602, and the L2V bit at block 603 is on, and (the xi request was not a demote at block 604 or the L2E bit is on at block 605), and for at least one L1 cache, the L1 cache valid bit in the L2 directory is on at block 613, and (the xi request is not a demote at block 614 or the L1 cache exclusive bit in the L2 directory is on at block 616), then an xi is sent to the L1(s). As discussed with respect to FIG. 4, an exemplary embodiment could have bits in the L2 directory entry indicating that multiple va syn values exist. For cases where a given L1 cache had multiple va syn values, then the single xi becomes multiple xi's, one for each possible value of the va syn bits. For the case where the xi is not a demote, an xi invalidate is sent at block 617, and the L2 directory's L1 valid bit is turned off at block 618. For the case where the xi was a demote and the L1 cache exclusive bit in the L2 directory is on, an xi demote is sent at block 619, and the L2 directory's L1 exclusive bit is turned off at block 620. Several other L2 directory fields are also updated at block 621. The L2V and L2E bits are updated, depending on the type of xi. Even if an xi isn't sent to the L1 cache(s), the L2 directory fields are updated 621, if there is an ra cmpr hit at block 602, and the L2V bit at block 603 is on, and (the xi request is not a demote at block 604 or the L2E bit is on at block 605). Although each L1 cache is checked, the L11V bit at blocks 613, 618 and the L11E bit at blocks 616, 620 are illustrated to simplify the flow diagram.

Technical effects and benefits include the avoidance of silicon area and cycletime degradation because the exemplary embodiments described herein do not require any unique sequencing or additional design complexity, and because a store-in L1 cache is not required, and L2 notification of L1 cache lruouts is not required. In addition, for designs that already assumed a va-indexed ra-tagged directory for the L1 cache(s), no additional arrays are needed, and no flattening of existing arrays is needed, avoiding a silicon area increase. Other than adding one value of the synonym bits to the L2 directory entry, no other array fields are widened, resulting in only a slight increase in silicon area. Because a va-indexed va-tagged directory is not required, the complexity of handling the case where translation results from the tlb mismatch the result from the va-tagged directory is avoided.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A multi-level cache hierarchy, comprising:
a set of L1 caches associated with one or more processor cores; and
a set of L2 caches,
wherein the set of L1 caches are a subset of the set of L2 caches,
wherein the set of L1 caches underneath a given L2 cache are associated with one or more of the processor cores,
wherein each of the set of L1 caches is virtual-address-indexed having a corresponding directory virtual-address-indexed and real-address-tagged, and wherein each of the set of L2 caches is real-address-indexed having a corresponding directory that is real-address-indexed and real-address tagged,
wherein the L1 directory includes control bits for valid and exclusive, and the L2 directory includes exactly one value of synonym bits that applies to the set of L1 caches underneath a L2 cache having the L2 directory, and wherein the L2 directory includes L2 control bits for valid and exclusive, and for each L1 cache of the set of L1 caches underneath L2 cache, L1 control bits for valid and exclusive, wherein the L1 exclusive bits are for L1 caches that are directly stored-to, wherein the valid and exclusive bits are configured to maintain mp coherency.

2. The hierarchy as claimed in claim 1, wherein a store approach for each of the set of L1 caches that are at least one of store-in and store-thru is a don't-care store approach.

3. The hierarchy as claimed in claim 1, wherein each of the set of L1 caches are not required to notify each of the set of L2 caches about L1 cache lruouts.

4. The hierarchy as claimed in claim 1, wherein the real-address-tagged L1 directory optionally includes at least one of a virtual-address-indexed virtual-address-tagged L1 directory, and a virtual-address-indexed virtual-address-tagged L1 set predict array.

5. The hierarchy as claimed in claim 1, wherein each of the set of L1 caches includes a tlb configured to translate virtual page addresses into real page addresses.

6. In a multi-level cache hierarchy, a method comprising:
mapping a virtual address fetch request from a processor core to a L1 cache to a real address by a tlb;
in response to the real address residing in a real-address-tagged L1 directory, returning fetch data from the L1 cache to the processor core;
in response to the real address absent from the real-address-tagged L1 directory, sending the real address and synonym bits associated with the real address as a fetch request to a L2 cache;
comparing real address bits and the synonym bits to a real-address-tagged L2 directory;
in response to at least one of an absence of a real address comparison, an L2 valid bit being off, and the fetch request to the L2 cache being exclusive with a L2 exclusive bit being off, sending a new fetch request to a next level of the multi-level cache hierarchy; and
in response to a real address comparison, the L2 valid bit being on, the L1 valid bit is on for at least one L1 cache in the multi-level cache hierarchy, the synonym bits mismatch, and at least one of the fetch request to the L2 cache being non-exclusive, and the L2 exclusive being on, performing:
sending the real address and a prior synonym bit value for an xi invalidate to one or more L1 caches in the multi-level cache hierarchy;
setting the L1 valid bit corresponding to the requesting L1 cache on and setting the L1 valid bits corresponding to one or more other L1 caches to off,
wherein the L1 exclusive bit is turned on in the L2 directory, in response to the fetch request is exclusive or in response to the fetch request as conditional-exclusive and other L1 valid bits set off and the L2 exclusive bit is on;
returning data to a requesting L1 cache; and
writing new synonym bit values into the L2 directory.

7. The method as claimed in claim 6 further comprising:
in response to a real address compare for an L2 fetch from L1, the L2 valid bit on, the fetch request exclusive, the L2 exclusive bit on, and the L1 valid bit on for at least one L1 cache of the set of L1 caches:
sending the real address and the synonym bit value for an xi invalidate to at least one of the set of L1 caches;
setting corresponding L1 valid bits to off;
returning data to the requesting L1 cache, wherein the L1 valid bit turned on in the L2 directory and the L1 exclusive bit turned on in the L2 directory in response to at least one of the fetch request being exclusive or in response to the fetch request being conditional-exclusive and other L1 valid being off and the L2 exclusive being on; and
writing the synonym bits value into the L2 directory.

8. A multi-level cache hierarchy, comprising:
a set of L1 caches associated with one or more processor cores; and
a set of L2 caches,
wherein the set of L1 caches are a subset of the set of L2 caches, wherein the set of L1 caches underneath a given L2 cache are associated with one or more of the processor cores, wherein the L1 directory includes control bits for valid and exclusive, and the L2 directory includes a value of synonym bits that applies to each L1 cache of the set of L1 caches underneath a L2 cache having the L2 directory, and wherein the L2 directory includes L2 control bits for valid and exclusive, and for each L1 cache of the set of L1 caches underneath L2 cache, L1 control bits for valid and exclusive.

9. The method as claimed in claim 8 wherein the L1 exclusive bits are for L1 caches that are directly stored-to, wherein the valid and exclusive bits are configured to maintain mp coherency.

10. The hierarchy as claimed in claim 8, wherein the L2 directory further includes a separate value for the synonym bits for each L1 cache underneath that L2 cache, such that a L1 cache of the set of L1 caches can have a different synonym value than another L1 cache.

11. The method as claimed in claim 10 wherein a separate synonym bit comparison occur for each L1 cache of the set of L1 caches, and a xi invalidate occurs in response to a mismatch for a L1 cache that sends a fetch.

12. The hierarchy as claimed in claim 8, wherein the L2 directory includes a status bit that determines whether multiple synonym values exist within the same L1 cache or between multiple L1 caches, and is configured to resolve a synonym mismatch among a set of L1 caches.

13. The hierarchy as claimed in claim 12 wherein the L2 directory is configured to send multiple xi invalidates that are generated by incrementing through all possible values of the synonym bits.

14. The hierarchy as claimed in claim 8, wherein the L2 directory includes multiple values for the synonym bits in a control vector for each L1 cache underneath that L2 cache, and is configured to resolve a synonym mismatch among a set of L1 caches.

15. The hierarchy as claimed in claim 14 wherein the L2 directory is configured to send multiple xi invalidates generated by using different synonym bits values that are based on control vector bits.

* * * * *